United States Patent
Burchard et al.

(10) Patent No.: US 7,969,970 B2
(45) Date of Patent: Jun. 28, 2011

(54) SWITCH DEVICE AND COMMUNICATION NETWORK COMPRISING SUCH SWITCH DEVICE AS WELL AS METHOD FOR TRANSMITTING DATA WITHIN AT LEAST ONE VIRTUAL CHANNEL

(75) Inventors: Artur Tadeusz Burchard, Eindhoven (NL); Ewa Hekstra-Nowacka, Waalre (NL)

(73) Assignee: NXP B.V., Eindhoven (NL)

( * ) Notice: Subject to any disclaimer, the term of this patent is extended or adjusted under 35 U.S.C. 154(b) by 769 days.

(21) Appl. No.: 11/577,179

(22) PCT Filed: Oct. 7, 2005

(86) PCT No.: PCT/IB2005/053302
§ 371 (c)(1),
(2), (4) Date: Oct. 3, 2007

(87) PCT Pub. No.: WO2006/040718
PCT Pub. Date: Apr. 20, 2006

(65) Prior Publication Data
US 2008/0049762 A1    Feb. 28, 2008

(30) Foreign Application Priority Data

Oct. 12, 2004 (EP) .................................... 04104984

(51) Int. Cl.
*H04L 12/50* (2006.01)
*H04L 12/28* (2006.01)
(52) U.S. Cl. ........................................ 370/386; 370/401
(58) Field of Classification Search .......... 370/386–388, 370/395.7, 401, 412–419
See application file for complete search history.

(56) References Cited

U.S. PATENT DOCUMENTS

| | | | |
|---|---|---|---|
| 5,754,783 A | 5/1998 | Mendelson et al. | |
| 5,983,291 A | 11/1999 | Leger et al. | |
| 6,339,596 B1 | 1/2002 | Kozaki et al. | |
| 6,625,155 B1 | 9/2003 | Dziong | |
| 6,888,843 B2 * | 5/2005 | Keller et al. | 370/429 |
| 7,180,862 B2 * | 2/2007 | Peebles et al. | 370/235 |
| 7,522,527 B2 * | 4/2009 | Jun et al. | 370/236 |
| 2001/0055277 A1 * | 12/2001 | Steely et al. | 370/236 |
| 2002/0064154 A1 * | 5/2002 | Sharma et al. | 370/357 |
| 2003/0093593 A1 | 5/2003 | Ennis | |
| 2003/0161303 A1 * | 8/2003 | Mehrvar et al. | 370/386 |
| 2004/0019726 A1 | 1/2004 | Kelley et al. | |
| 2004/0019729 A1 | 1/2004 | Kelley et al. | |
| 2005/0053057 A1 * | 3/2005 | Deneroff et al. | 370/360 |

(Continued)

OTHER PUBLICATIONS

"PCI Express Base Specification", Revision 1.0A, Apr. 15, 2003.

(Continued)

*Primary Examiner* — Hong Cho (57) ABSTRACT

In order to provide a switch device (100; 100') connecting at least one first point (10, 12), in particular connecting at least one source device and/or at least another switch device, to at least one second point (20, 22, 24), in particular to at least one destination device and/or to at least another switch device, the switch device (100; 100') comprising at least one virtual channel (30, 32), wherein it is possible to arbitrate and/or differentiate data, in particular data packets or data streams, being transmitted within the same virtual channel (30, 32), it is proposed that the switch device (100; 100') comprises at least two ports (40, 42), in particular input ports, for receiving and/or at least two ports (50, 52), in particular output ports, for sending the data, in particular the data packet or data stream, the ports (40, 42, 50, 52) being respectively assigned to the virtual channel (30, 32).

10 Claims, 7 Drawing Sheets

U.S. PATENT DOCUMENTS

2007/0110045 A1* 5/2007 Shinohara .................... 370/386
2007/0223468 A1* 9/2007 Nishizaki ..................... 370/386

OTHER PUBLICATIONS

Jasmin Ajanovic and Hong Jiang, "Multimedia and Quality of Service Support in PCI Express Architecture", White Paper, Intel Corporation, Sep. 19, 2002.

Edward Solari and Brad Congdon, "The Complete PCI Express Reference", Intel Press, 2003.

Fernandez, J. et al. "Improving the Performance of Real-Time Communication Services on High-Speed LANs Under Topology Changes," Proc. 27th Annual IEEE Conf. on Local Computer Networks (LCN2002), pp. 385-394 (2002).

* cited by examiner

SWITCH DEVICE AND COMMUNICATION NETWORK COMPRISING SUCH SWITCH DEVICE AS WELL AS METHOD FOR TRANSMITTING DATA WITHIN AT LEAST ONE VIRTUAL CHANNEL

The present invention relates to a switch device connecting at least one first point, in particular connecting at least one source device and/or at least another switch device, to at least one second point, in particular to at least one destination device and/or to at least another switch device, the switch device comprising at least one virtual channel.

The present invention further relates to a communication network or communication system for transmitting data, in particular at least one data packet or data stream, within at least one virtual channel.

The present invention further relates to a method for transmitting data, in particular data packets or data streams, within at least one virtual channel.

For off-chip interconnects, there is a clear shift towards lower pin-count serial technology and towards organising connections between devices in a network-like style. The communicated data is organised in streams of consecutive packets. For predictability, i. e. real-time applications, streams of different nature, for example video and audio, can be classified as separate traffic classes being differently treated by a network.

So-called virtual channels (VCs) are used in order to decouple those streams of different classes being transmitted over a shared physical connection. Each virtual channel has a certain part of the connection resources, for example physical link bandwidth or buffering, reserved or guaranteed. Data transmitted via different virtual channels arbitrate in a predictable way for a shared resource. By mapping streams of certain traffic classes onto particular virtual channels, mentioned differentiation between streams is achieved.

Above-described principles for organising predictable traffic are used in a newly standardised Intel's P[eripheral]C[component]I[nterconnect] Express off-chip bus/network as described in prior art document "PCI Express Base Specification", Revision 1.0a, Apr. 15, 2003.

Moreover, the prior art articles by
Jasmin Ajanovic and Hong Jiang, "Multimedia and Quality of Service Support in PCI Express Architecture", White Paper, Intel Corporation, Sep. 19, 2002, and
Edward Solari and Brad Congdon, "The Complete PCI Express Reference", Intel Press, 2003
consider the decoupling of data streams over multiple virtual channels in PCI Express networks.

The basic principle of PCI Express bridges is described in prior art document US 2004/0019729 A1. Moreover, in prior art document US 2004/0019726 A1 a system being built out of such PCI Express bridges is explained.

Both above-mentioned prior art documents describe a way of building a PCI Express bridge
having two separate (PCI Express and PCI) domains,
implementing a novel way or reordering of packets of different type, and
implementing a concept of a single input buffer.

However, differentiation of packets of the same type inside the same virtual channel is not considered in these prior art documents US 2004/0019726 A1 and US 2004/0019729 A1. The reordering is only done between different packet types, which is in the PCI Express specification. When there are two packets of the same type, for example Read Request but from different streams, there is no way of arbitrating which packet goes first. Both packets are treated as belonging to the same V[irtual]C[hannel], i. e. to the same logical stream.

However, such principles are also known from for instance A[synchronous]T[ransfer]M[ode] transmission networks. Exemplarily, in prior art document U.S. Pat. No. 6,339,596 B1 an ATM switching system is described. A new admission control technique in ATM networks, in particular a new way of calculating
needed bandwidth for a connection and
that bandwidth that is already in the network,
using some specific model is described in prior art document U.S. Pat. No. 6,625,155 B1.

In the following, the principle of decoupling data streams that are transmitted over virtual channels (VCs) according to the prior art is described in more detail with reference to FIGS. 1, 2, 3.

Figure 1:
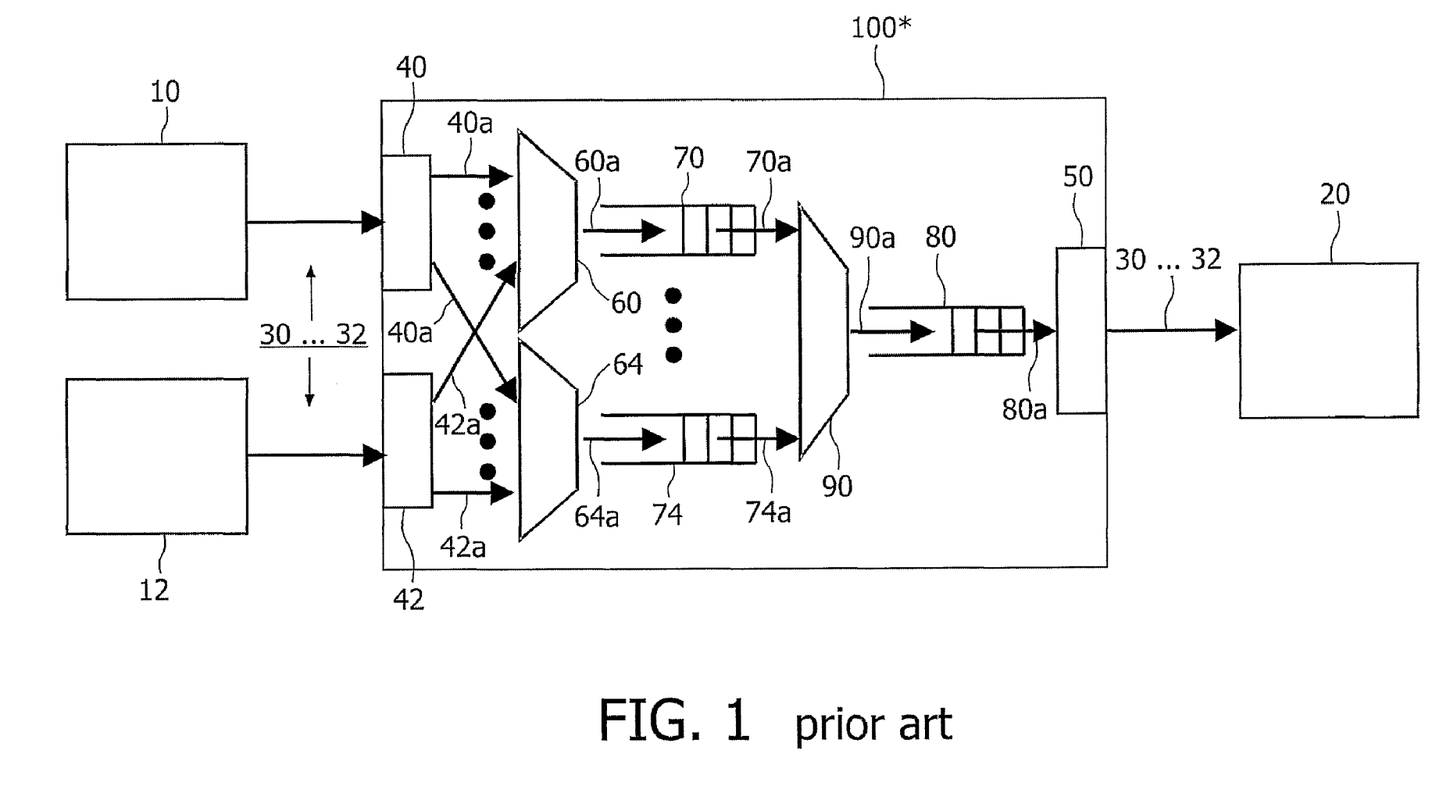

In FIG. 1, a conventional switch 100* connecting an arbitrary number (N) of source devices 10, 12 is shown. The number of virtual channels 30, 32 is eight. Each packet coming from a particular input port 40, 42 according to its traffic class is routed to a certain virtual channel arbiter 60, 64. Such arbiter 60, 64 arbitrates packets incoming from different input ports 40, 42 within a certain virtual channel 30, 32. Subsequently, the packets of a particular virtual channel 30, 32 are routed to an output arbiter 90 arbitrating access to an output port 50 between packets coming from different virtual channels 30, 32.

The above-described approach has some disadvantages. One of these disadvantages is a limited amount of virtual channels 30, 32. As example, for PCI Express this is set in the specification to be eight. Therefore, a device 10, 12 connected via a single connection to another device 20 can use a maximum number of virtual channels, in case of PCI Express a maximum number of eight virtual channels.

As a consequence, arbitration between packets transmitted over a single connection, for example over a single port 40, can only be performed between those packets belonging to different virtual channels 30, 32. As depicted in FIG. 2, there can only be a limited (to the maximum number of V[irtual]C[hannel]s 30, 32, in case of PCI Express eight) number of different streams on one connection.

Since in PCI Express only eight virtual channels are allowed, each end point 10, 12 and/or 20, for example each source device and/or each destination device, attached to the PCI Express network can send only eight independent streams. If a PCI Express network should send a ninth stream, this ninth stream has to be multiplexed with one of the previous eight streams, and there is no way of differentiating services of the PCI Express for packets of the same type for both multiplexed and/or combined streams.

A specific case of the previously discussed generic problem exists in a device or switch unit 100* with only one virtual channel 30. Such conventional switch unit 100* comprising a single connection using a single virtual channel 30 is depicted in FIG. 3. In such extreme, but frequent case no differentiation is possible between packets transmitted through a single connection.

However, in certain situations, for example like destination performance bottleneck, or due to congestions of a network, it would be beneficial to be able to differentiate between packets sent via a single connection even for the same virtual channel 30, 32.

In prior art document U.S. Pat. No. 5,754,783, an apparatus for interleaving timed program data with secondary data is described, wherein it is proposed to differentiate transport streams by using the same ports for multiple transport streams. However, since the apparatus according to this prior art document is not based on virtual channels, this prior art document cannot provide a solution for the problem of differentiating different data streams within one single virtual channel.

Starting from the disadvantages and shortcomings as described above and taking the prior art as discussed into account, an object of the present invention is to further develop a switch device of the kind as described in the chapter "Technical field", a communication network or communication system of the kind as described in the chapter "Technical field" and a method of the kind as described in the chapter "Technical field" in such way that data, in particular data packets or data streams, being transmitted within the same virtual channel can be arbitrated and/or differentiated.

The object of the present invention is achieved by a switch device comprising
- at least two ports, in particular input ports, for receiving and/or
- at least two ports, in particular output ports, for sending data, in particular at least one data packet or data stream, the ports being respectively assigned to the virtual channel. Moreover, the object of the present invention is achieved by a communication network or communication system comprising the features of claim 7 as well as by a method comprising the features of claim 9. Advantageous embodiments and expedient improvements of the present invention are disclosed in the respective dependent claims.

The present invention is principally based on the idea to use multiple ports for a single connection that allows for differentiation of data, in particular of traffic or of streams, within a single virtual channel. Thus, for differentiation of traffic or of streams within a single virtual channel, the present invention proposes to use multiple connections or multiple ports, in particular multi-port connections, instead of a single one. Therefore, the present invention provides a peer-to-peer connection stream differentiation within a single virtual channel.

For differentiation or arbitration of streams within a single virtual channel or within the same virtual channel, multiple ports for point-to-point connections are used. This principle is directly applicable for PCI Express off-chip connections and for other connections using the concept of virtual channels.

According to a particularly inventive refinement of the present invention, for a single connection, for example for a PCI Express connection, between a first point and a second point, in particular between devices, for example between an end point (source device and/or destination device) and a switch device, as many separate ports (so-called links) as the number of the streams
- that share the same virtual channel,
- that come from a first point, in particular from a source device, and
- that need to be differentiated for example
- in the second point, in particular in the destination device, and/or
- at the at least one output port of the switch device, are used. Thus, different priorities between these streams can be set during configuration allowing for arbitration and therefore for differentiation of these streams.

Figure 2:
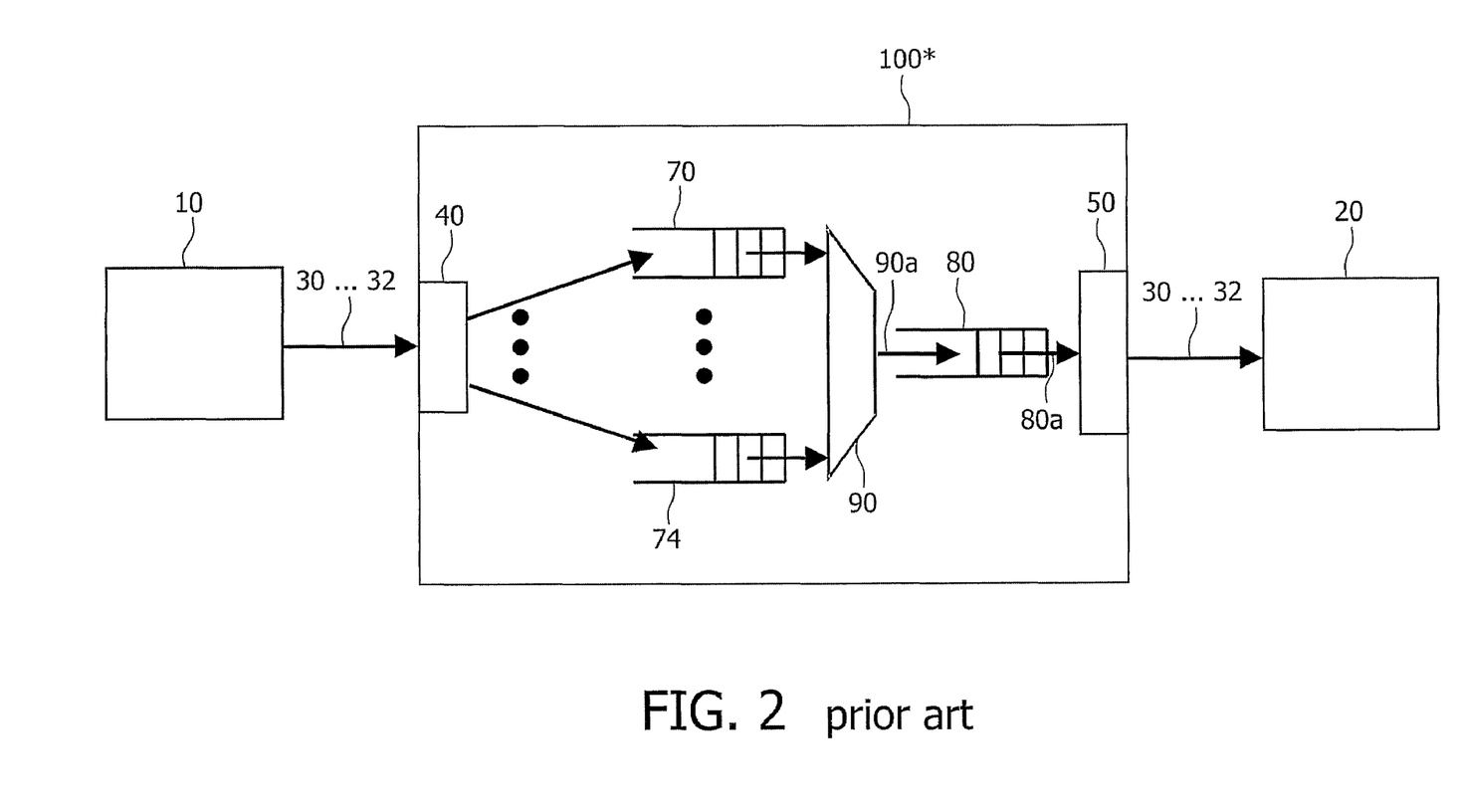
FIG. 2 schematically shows a switch device with a single connection and with multiple virtual channels as a prior art embodiment.
Figure 3:
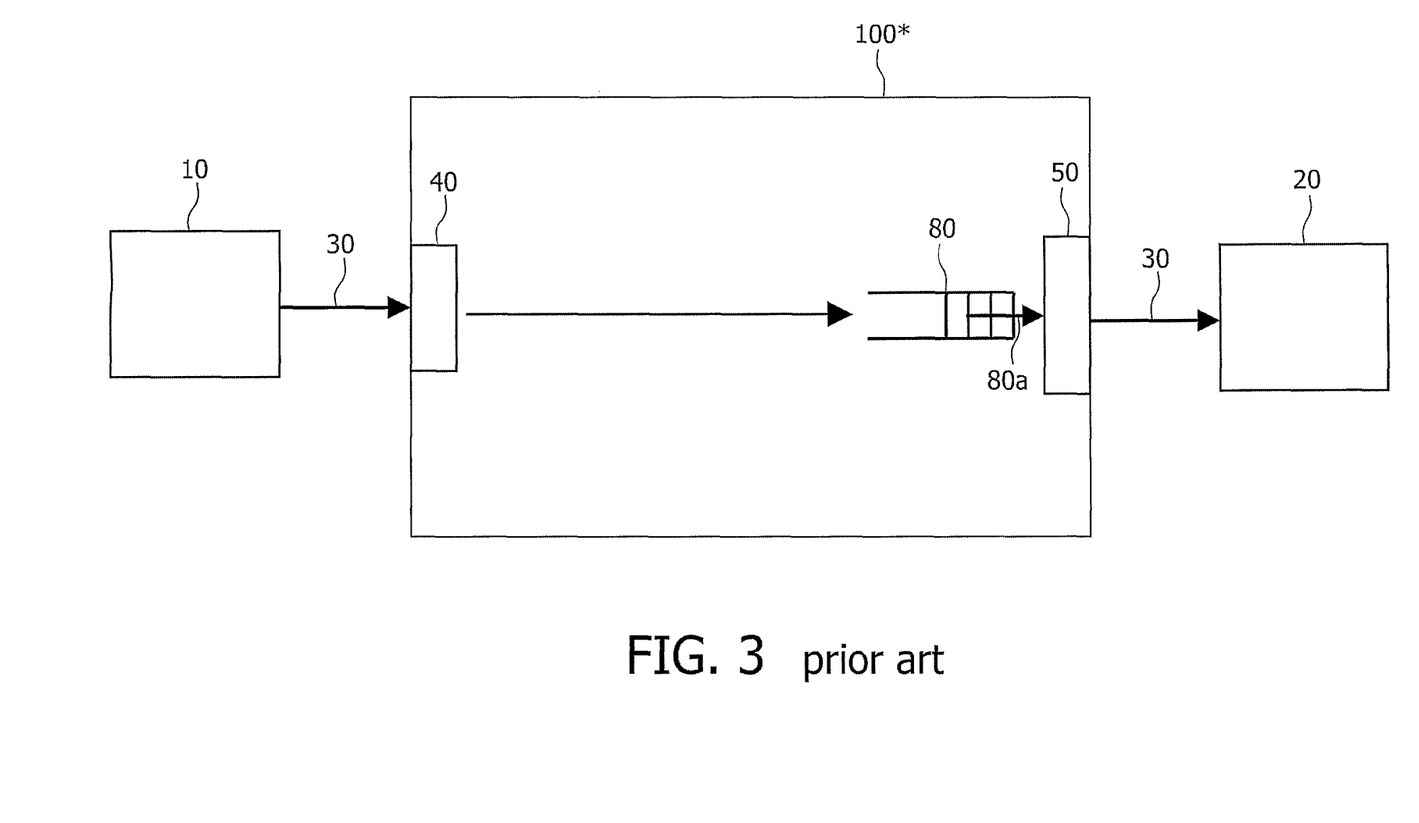
FIG. 3 schematically shows a switch device with a single connection and with a single virtual channel as a prior art embodiment.

Moreover, in an advantageous embodiment of the present invention, a conventional PCI Express port arbitration mechanism of unchanged PCI Express switches, bridges, etc. as discussed above in the chapter "Background and prior art" with reference to FIGS. 1, 2, 3 can be used. To this PCI Express port arbitration mechanism at least another port is added, thus at least another connection is added in order to differentiate between two streams within the same virtual channel which is not possible with conventional PCI Express configuration. The PCI Express port arbitration can also be programmed in a specific way and/or for a specific purpose.

Appropriately,
- the ports for receiving data, in particular the input ports, are arranged in the area of the first point and/or
- the ports for sending data, in particular the output ports, are arranged in the area of the second point.

For arbitration of data streams incoming from different first points and outgoing to the same second point when they are assigned to the same virtual channel, advantageously multiple input ports and/or multiple output ports are used for a single connection or for a particular connection. In contrast to this advantageous embodiment of the present invention, in conventional systems only a single input port and only a single output port is used for a single connection.

By using multiple input ports, different streams coming from the same first point and sharing the same virtual channel, and therefore conventionally (i. e. without using multiple input ports) would not be distinguishable, according to the present invention can have different priorities and can arbitrate for the at least one output port which in turn allows for their differentiation. This increases overall predictability and flexibility of the system according to the present invention.

According to a particularly inventive refinement of the present invention at least two of the switch devices using multiple ports for point-to-point connections can be connected and/or cascaded. Such configuration allows for differentiation of streams within a single virtual channel for the whole network. The idea is directly applicable for PCI Express off-chip network and for other networks using the concept of virtual channels.

To create a communication network allowing for differentiation of streams even in one virtual channel according to the particularly inventive refinement of the present invention it is proposed to connect switch devices, in particular blocks, as described above.

The blocks can be modified and optionally additionally to usage of multiple input ports instead of a single input port, also multiple output ports instead of a single output port are used for a particular connection. This allows arbitration of data streams incoming from different ports and outgoing to different ports when these data streams are assigned to the same virtual channel.

In this way, different streams sharing the same virtual channel coming from different input ports can be routed to different output ports. Therefore, a network using such blocks can differentiate between streams using the same virtual channel. As a result, in every place in the network it is possible to differentiate streams belonging to the same virtual channel. Thus, the problem of stream differentiation is solved for the whole network.

In general, the present invention can be applied, in fact, in any connection infrastructure (system) using a virtual channel concept as described in the chapter "Background and prior art" above. In particular, PCI Express enabled devices can use the scheme of the present invention.

In particular, the present invention finally relates to the use of at least one switch device as described above and/or of at least one communication network or communication system as described above and/or of the method as described above for arbitration and/or differentiation of data, in particular data packets or data streams, being transmitted within the same virtual channel, in particular
- in at least one building network,
- in at least one off-chip network,
- in at least one P[eripheral]C[omponent]I[nterconnect] Express network, and/or
- in least one A[synchronus]T[ansfer]M[ode] network.

As already discussed above, there are several options to embody as well as to improve the teaching of the present invention in an advantageous manner. To this aim, reference is made to the claims respectively dependent on claim 1 and on claim 7; further improvements, features and advantages of the present invention are explained below in more detail with reference to two preferred embodiments by way of example and to the accompanying drawings where FIG. 1 schematically shows a switch device with multiple connections and with multiple virtual channels as a prior art embodiment;

The same reference numerals are used for corresponding parts in FIG. 1 to FIG. 7.

In order to avoid unnecessary repetitions, the following description regarding the embodiments, characteristics and advantages of the present invention relates (unless stated otherwise)
- to the first embodiment of the switch device 100 according to the present invention (cf. FIGS. 4, 5) as well as
- to the second embodiment of the switch device 100' according to the present invention (cf. FIG. 6) as well as
- to the communication network or communication system 200 according to the present invention (cf. FIG. 7), all embodiments 100, 100' being operated according to the method of the present invention.

Figure 4:
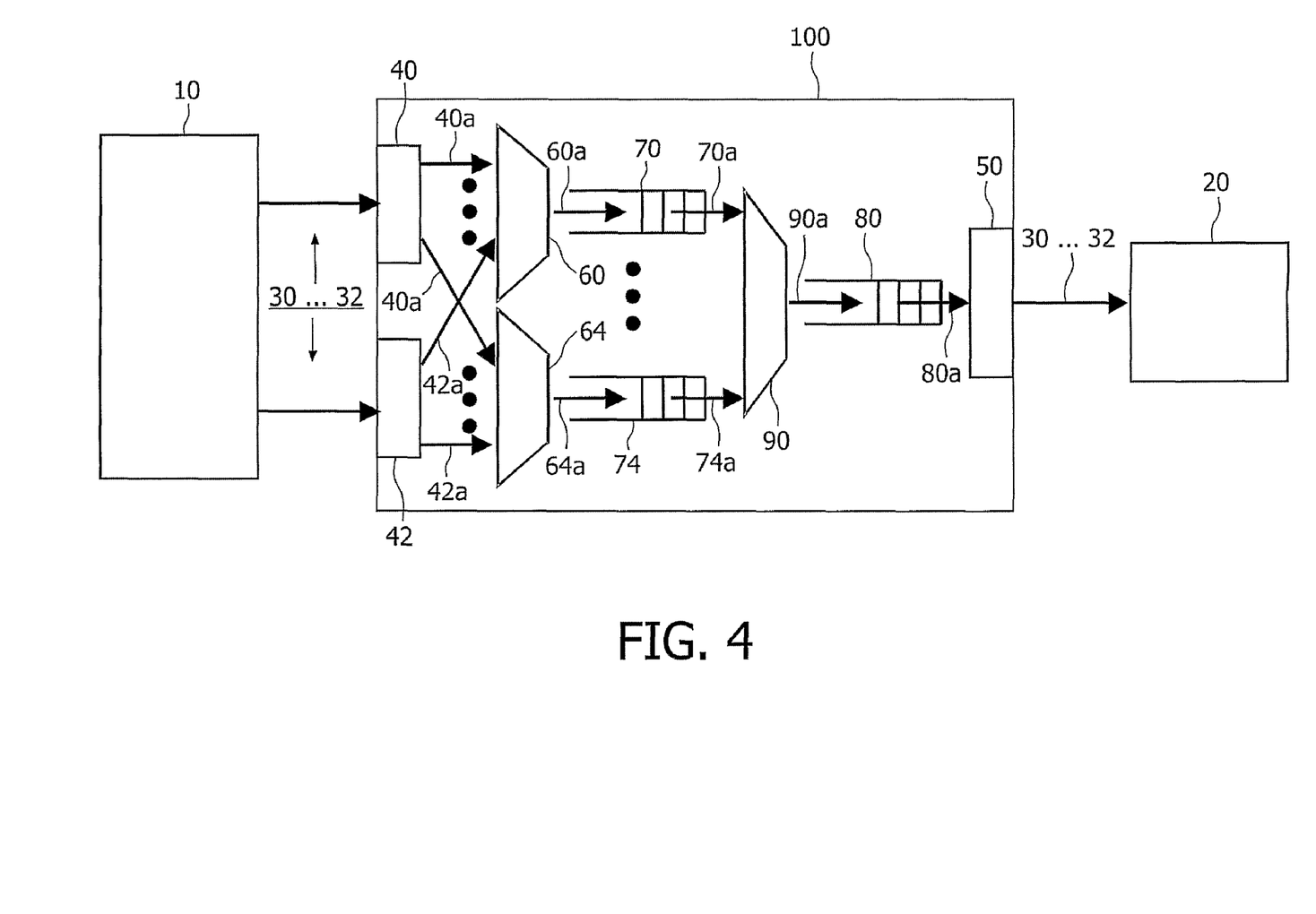
FIG. 4 schematically shows a first embodiment of a switch device according to the present invention with a single multi-port connection and with multiple virtual channels, the switch device working according to the method of the present invention.
Figure 5:
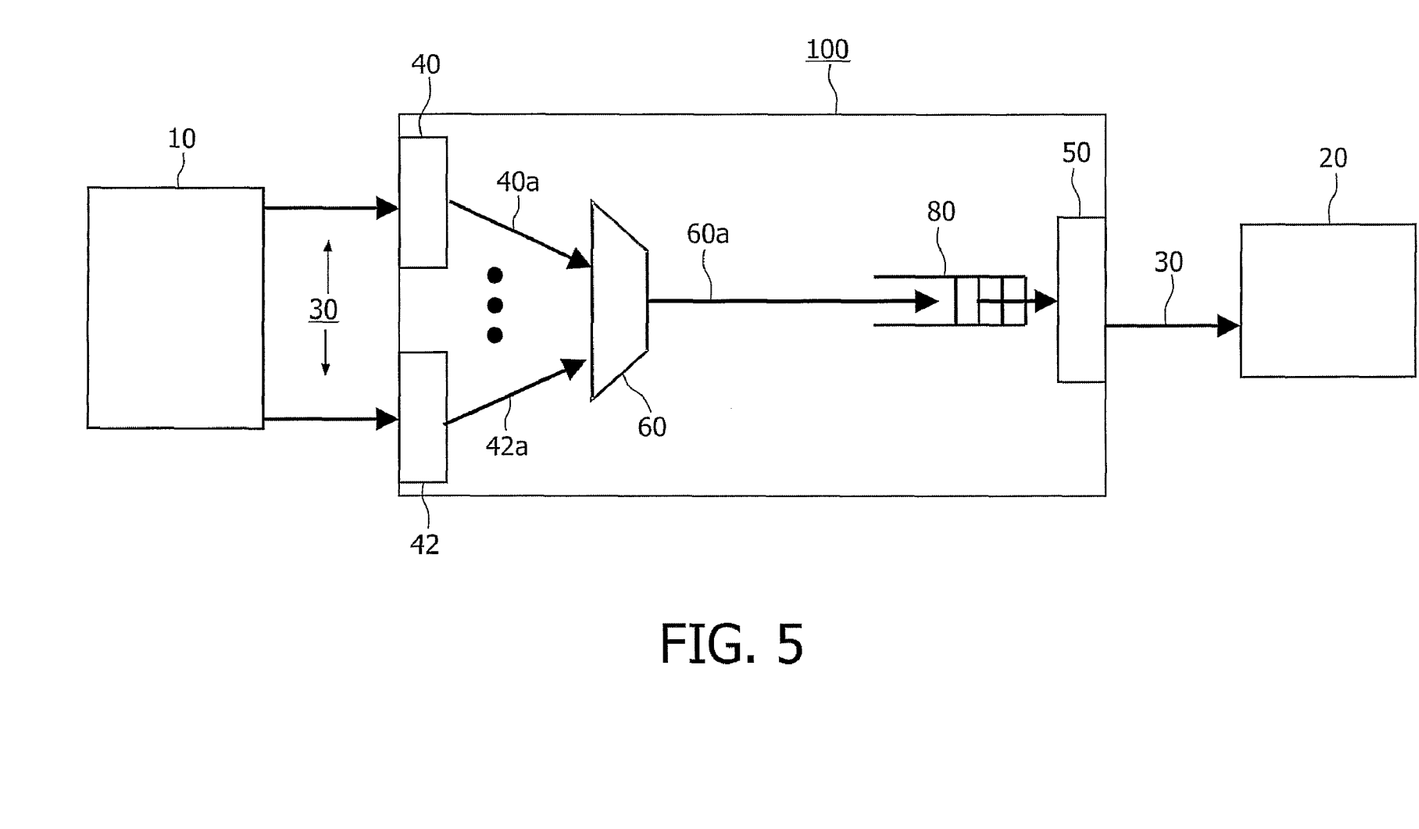
FIG. 5 schematically shows the switch device of FIG. 4 with a single multi-port connection and with a single virtual channel, the switch device working according to the method of the present invention.

In FIGS. 4, 5 a switch device 100 for stream differentiation within a single virtual channel 30, 32 is depicted. The switch device 100 connects a first point 10, namely a source device, to a second point 20, namely to a destination device. According to FIG. 4, the switch device 100 comprises eight virtual channels 30, 32, multiple input ports 40, 42 for receiving data as well as one output port 50 for sending data, wherein the input ports 40, 42 are respectively assigned to the virtual channels 30, 32.

Moreover, the switch device 100 according to FIG. 4 comprises eight virtual channel arbiter units 60, 64, each arbiter unit 60, 64 being respectively assigned to the virtual channel 30, 32 and being provided with output signals 40a, 42a from each input port 40, 42.

For buffering the data, the switch device 100 depicted in FIG. 4 comprises eight virtual channel buffer units 70, 74 being respectively assigned to the virtual channel 30, 32. These buffer units 70, 74 are
- are arranged between the respective virtual channel arbiter units 60, 64 and the output port 50 and
- are provided with output signals 60a, 64a from the respective virtual channel arbiter unit 60, 64.

Furthermore, the switch device 100 depicted in FIG. 4 comprises an output arbiter unit 90 being provided with output signals 70a, 74a from each virtual channel buffer unit 70, 74. An output buffer unit 80 is provided with output signals 90a of the output arbiter unit 90, wherein the output buffer unit 80 is arranged between the output arbiter unit 90 and the output port 50.

By the embodiment of the switch device 100, the problem of lack of arbitration per single virtual channel 30, 32 is solved. To this aim, in comparison to the conventional switch device 100* (as described in the chapter "Background and prior art" and as shown in FIG. 1), the switch device 100 according to FIGS. 4, 5 comprises the additional or further ports 42.

The rest of the switch device 100 in principle is similar to the conventional system of FIG. 1. However, in the switch device 100 according to FIG. 4 the port arbitration principle is used to differentiate data transmitted from the same source, namely from the first point 10, within the same virtual channel 30, 32 which is new in such context.

When comparing the system 100* of FIG. 1 and the system 100 of FIG. 4, other ports for other devices should be added and routed to appropriate arbiters in FIG. 4. In that sense, FIG. 1 describes multiple connections while FIG. 4 describes a single multi-port connection. For the sake of clarity, the multi-port/multi-connection/multiple V[irtual]C[hannel]s case is not shown in the drawings.

However, for a better understanding, in FIG. 5 a specific situation of the embodiment of the switch device 100 represented by FIG. 4 is depicted. The embodiment of the switch device 100 solves the problem shown in FIG. 3 with a single V[irtual]C[hannel] support 30. This simple figure also explains the best how the concept of adding new ports 42 enables arbitration within a single virtual channel 30.

The switch device 100 according to FIG. 5 comprises one virtual channel 30 and multiple input ports 40, 42 for receiving data as well as one output port 50 for sending data, wherein the input ports 40, 42 are assigned to the virtual channel 30. Moreover, the switch device 100 according to FIG. 5 comprises a virtual channel arbiter unit 60 being provided with output signals 40a, 42a by each input port 40, 42.

For buffering the data, the switch device 100 depicted in FIG. 5 comprises an output buffer unit 80 being arranged between the channel arbiter unit 60 and the output port 50, wherein the output buffer unit 80 is provided with output signals 60a of the virtual channel arbiter unit 60.

However, in order to be able to arbitrate the traffic within a single virtual channel 30 the number of ports 40, 42 needs to be increased, which causes increased costs and overall complexity of the system 100. Nevertheless, it is beneficial to be able to differentiate between packets sent via a single connection even for the same virtual channel 30. This as an advantage causes increased number of separate streams which can be accommodated in the switch device 100.

When composing the network out of devices described in FIGS. 1, 4, 5 the network 200 will not be able to differentiate between streams in the same virtual channel 30. In the first case (cf. FIG. 1), the network is not able to differentiate streams at all; in the second case (cf. FIGS. 4, 5), the network is not able to differentiate at the output port 50.

Figure 6:
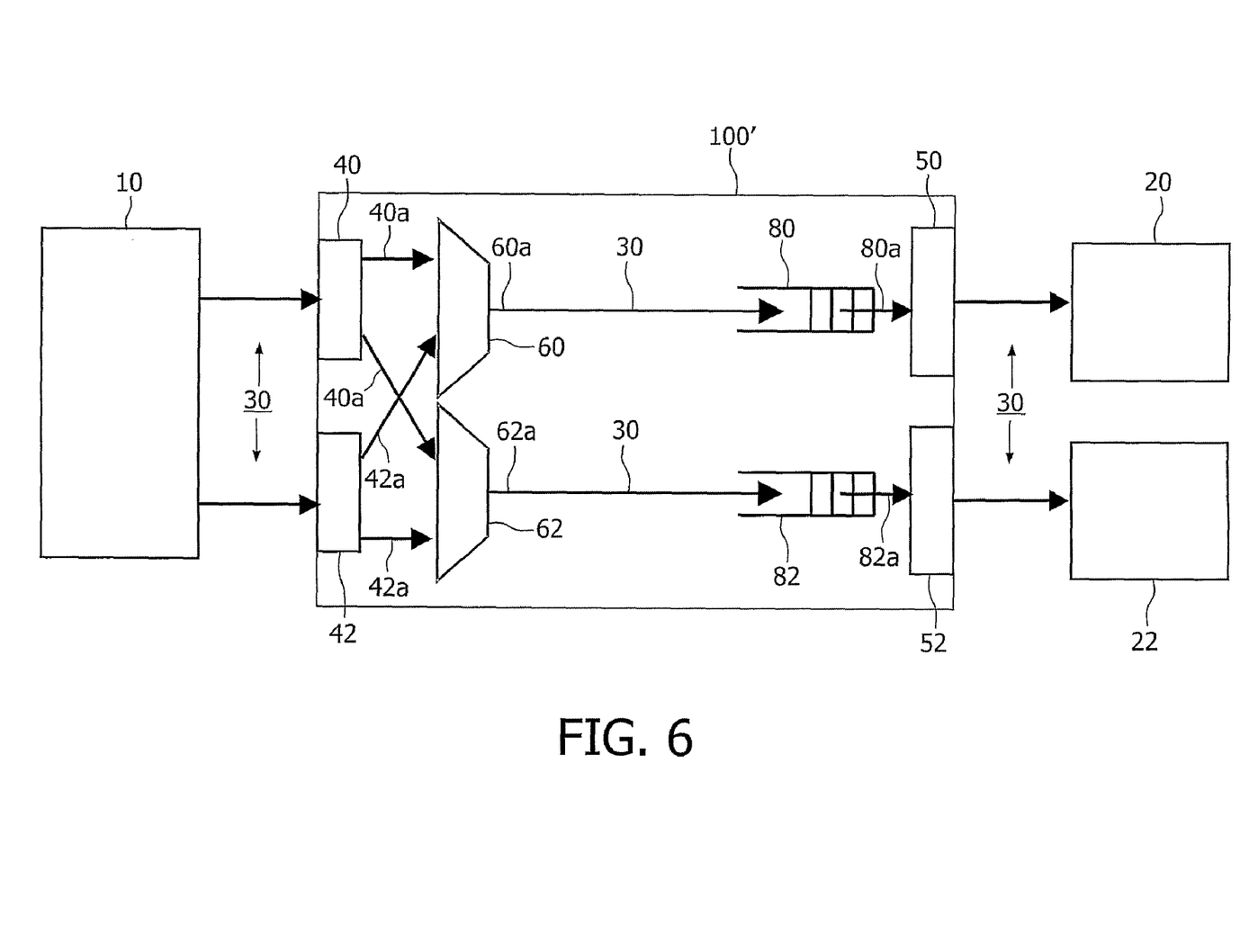
FIG. 6 schematically shows a second embodiment of a switch device according to the present invention with a single multi-port connection and with a single virtual channel, the switch device working according to the method of the present invention.
Figure 7:
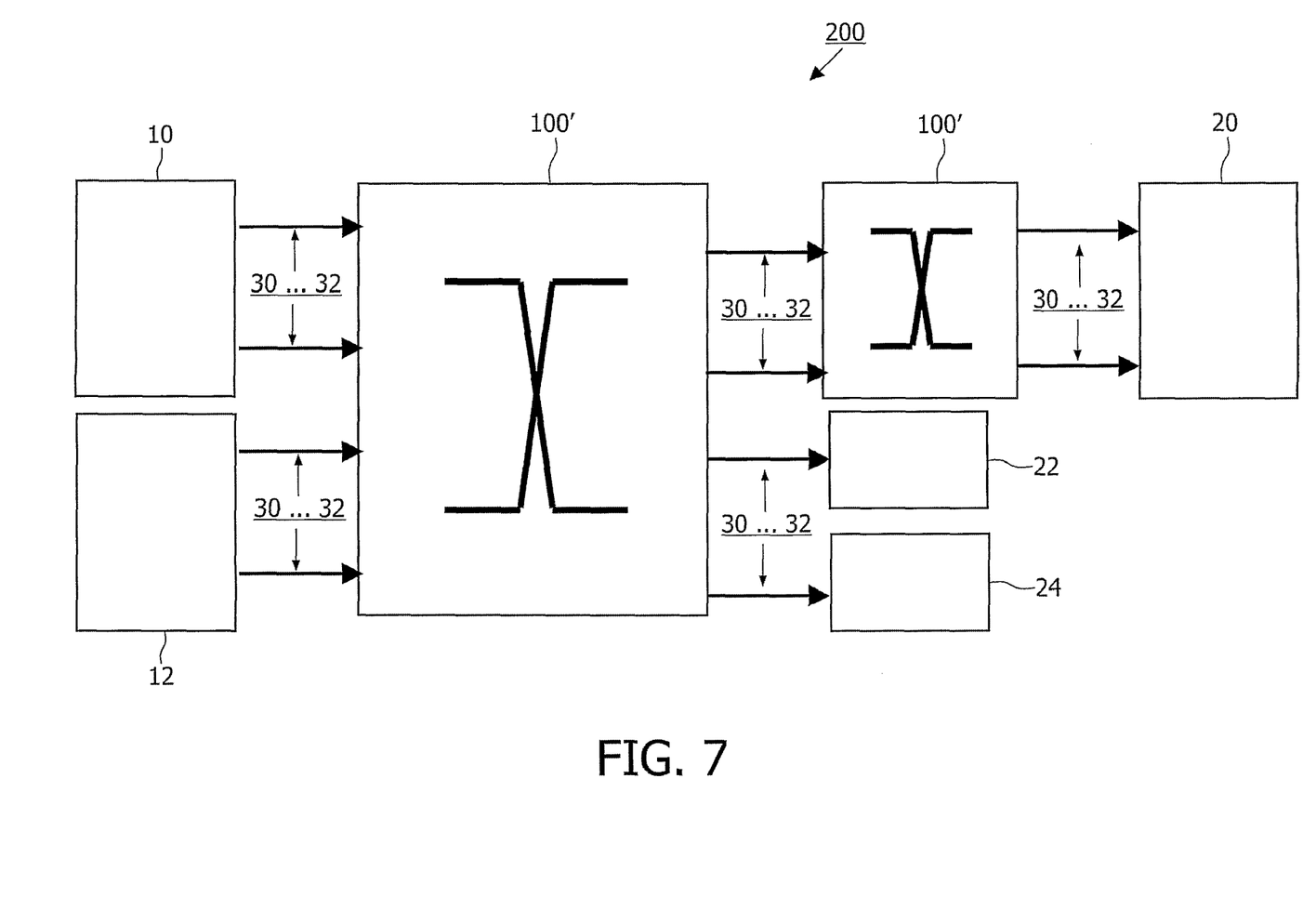
FIG. 7 schematically shows a communication network or communication system according to the present invention comprising the switch device of FIG. 6.

In FIGS. 6, 7 an off/on-chip interconnect network 200 with stream differentiation within a single virtual channel 30 is depicted. To this aim, a module, namely a switch device 100' allowing the data transmitted in the same virtual channels to be assigned to different output ports 50, 52 is presented. Compared to the switch device 100 as depicted in FIGS. 4, 5, some modifications are done to the switch device 100' in order to support this new network feature.

The switch device 100' uses for a single connection, for instance from switch 100' to switch 100', two or more connections and two or more ports 40, 42 and 50, 52 at each side. Moreover, port arbiters can be programmed at each side according to priorities of different streams inside the same virtual channel 30, 32.

The embodiment presented in FIG. 6 solves the problem of output ports 50, 52 not being available for single virtual channel 30, 32. The device comprises additional output ports 52 and in principle, the rest of this embodiment is similar to the system of FIG. 5.

However, contrarily to FIG. 5, the switch device 100' comprises two virtual channel arbiter units 60, 62, both being assigned to the single virtual channel 30. Moreover, the device 100' comprises two output buffer units 80, 82 being assigned to the single virtual channel 30. These output buffer units 80, 82 are arranged between the respective virtual channel arbiter unit 60, 62 and the respective output port 50, 52. Moreover, the output buffer units 80, 82 are provided with output signals 60a, 62a of the virtual channel arbiter units 60, 62 being assigned to the virtual channel 30.

When connecting or cascading devices 100' as described in FIG. 6, a network 200 is created, which comprises the new property of being able to differentiate between data transmitted within one virtual channel 30, 32 along the entire path, i.e. from the source devices 10, 12 to the destination devices 2Q, 22, 24. An example of such network 200 is presented in FIG. 7. Whereas the switch device 100 according to FIG. 5 treats one single multi-port connection, in FIG. 7 a whole network 200 created of single multi-port connections is depicted.

Finally, an example for a situation in which it is beneficial to be able to differentiate between packets sent via a single connection even for the same virtual channel 30, 32 is given:

A video decoder produces video material that is displayed at destination device 20 as a main window combined with a smaller video window or with overlay graphics. Conventionally, all packets containing this video data would be assigned to a certain traffic class and therefore to a certain V[irtual]C[hannel] 30, 32. All video packets therefore are treated to be of the same importance.

However, in certain situations, like destination performance bottleneck, or due to congestions of the network, not all packets can be delivered. By arbitration between packets sent via a single connection even for the same virtual channel, for example packets that belong to main video and to overlay graphics, the system can decide to give a priority to the main video packets over the graphics data packet.

LIST OF REFERENCE NUMERALS

100* switch device (prior art; cf. FIGS. 1, 2, 3)
100 switch device, in particular first switch device (first embodiment of the present invention; cf. FIGS. 4, 5)
100' switch device, in particular first switch device (second embodiment of the present invention; cf. FIGS. 6, 7)
10 first point, in particular source device, in relation to the switch device 100, 100'
12 another first point, in particular second source device, in relation to the switch device 100, 100'
20 second point, in particular destination device, in relation to the switch device 100, 100'
22 another second point, in particular second destination device, in relation to the switch device 100, 100'
24 yet another second point, in particular third destination device, in relation to the switch device 100, 100'
30 virtual channel, in particular first virtual channel
32 further virtual channel, in particular eighth virtual channel
40 first port, in particular first input port, for receiving data
40a output signal of the first port 40
42 second port, in particular second input port, for receiving data
42a output signal of the second port 42
50 first port, in particular first output port, for sending data
52 second port, in particular second output port, for sending data
60 virtual channel arbiter unit, in particular first virtual channel arbiter unit, assigned to the virtual channel 30
60a output signal of the virtual channel arbiter unit 60
62 second virtual channel arbiter unit assigned to the single virtual channel 30
62a output signal of the second virtual channel arbiter unit 62
64 further virtual channel arbiter unit assigned to the further virtual channel 32, in particular eighth virtual channel arbiter unit assigned to the eighth virtual channel 32
64a output signal of the further virtual channel arbiter unit 64
70 virtual channel buffer unit, in particular first virtual channel buffer unit, assigned to the virtual channel 30
70a output signal of the virtual channel buffer unit 70
74 further virtual channel buffer unit assigned to the further virtual channel 32, in particular eighth virtual channel buffer unit assigned to the eighth virtual channel 32
74a output signal of the further virtual channel buffer unit 74
80 output buffer unit, in particular first output buffer unit, assigned to the virtual channel 30
80a output signal of the output buffer unit 80
82 second output buffer unit assigned to the single virtual channel 30
82a output signal of the second output buffer unit 82
90 output arbiter unit
90a output signal of the output arbiter unit
200 communication network or communication system
N arbitrary number or undefined number

The invention claimed is:
1. A switch device connecting a first point, a source device or a second switch device to a second point, to a destination device or to a third switch device, the switch device comprising a virtual channel, characterized by at least two input ports for receiving data, the at least two input ports being assigned to the virtual channel; and at least two output ports for sending data, in particular a data packet or data stream, the at least two output ports being assigned to the virtual channel; and a plurality of virtual channel arbiter units which receive data from the input ports;

wherein the virtual channel arbiter units differentiate data transmitted from the source within the virtual channel.

2. The switch device according to claim 1, wherein the input ports for receiving data are arranged in the area of the first point or the output ports for sending data are arranged in the area of the second point.

3. The switch device according to claim 1, characterized by a virtual channel arbiter unit being respectively assigned to the virtual channel and being admittable with at least one output signal of each input port.

4. The switch device according to claim 1, characterized by a virtual channel buffer unit being respectively assigned to the virtual channel or being arranged between the respective virtual channel arbiter unit and the output port or being admittable with at least one output signal of the respective virtual channel arbiter unit.

5. The switch device according to claim 1, characterized by an output buffer unit being assigned to the virtual channel or being arranged between the respective virtual channel arbiter unit and the output port or being admittable with at least one output signal of the respective virtual channel arbiter unit.

6. The switch device according to claim 5, characterized by an output arbiter unit being admittable with an output signal of each virtual channel buffer unit and by the output buffer unit being arranged between the output arbiter unit and the output port and being admittable with at least one output signal of the output arbiter unit.

7. A communication network or communication system for transmitting data, in at least one data packet or data stream, within the virtual channel, characterized by the switch device according to claim 1 for receiving, in particular for accepting, for reading and/or for updating the data being transmitted from the first point, and for switching the data to the second point.

8. The communication network according to claim 7, characterized by being based on an off-chip interconnect.

9. A method for transmitting data, in particular data packets or data streams, within a virtual channel, comprising the steps of:

receiving each data packet or data stream at an input port, and transmitting each data packet or data stream from a separate output port, wherein the data packets or data streams being sent in the virtual channel are at least one of arbitrated and differentiated.

10. A switch device, comprising:

a plurality of input ports for receiving data from a source, said plurality of input ports being assigned to a virtual channel;

an output port for sending data to a destination;

a virtual channel corresponding to and receiving data from the input ports;

a virtual channel arbiter unit corresponding to the virtual channel and receiving output signals from the input ports;

wherein the output signals are transferred to the output port; and wherein the virtual channel arbiter unit differentiates data transmitted from the source within the virtual channel.

* * * * *